(12) United States Patent
Guo et al.

(10) Patent No.: US 10,874,937 B2
(45) Date of Patent: Dec. 29, 2020

(54) INTELLIGENT HARDWARE INTERACTION METHOD AND SYSTEM

(71) Applicant: TENCENT TECHNOLOGY (SHENZHEN) COMPANY LIMITED, Shenzhen (CN)

(72) Inventors: Sijin Guo, Shenzhen (CN); Zhihui Ju, Shenzhen (CN); Jianing Lv, Shenzhen (CN); Tao Deng, Shenzhen (CN); Qiuli Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 46 days.

(21) Appl. No.: 15/829,050

(22) Filed: Dec. 1, 2017

(65) Prior Publication Data
US 2018/0078851 A1 Mar. 22, 2018

Related U.S. Application Data

(63) Continuation of application No. PCT/CN2016/099088, filed on Sep. 14, 2016.

(30) Foreign Application Priority Data

Sep. 23, 2015 (CN) .......................... 2015 1 0611668

(51) Int. Cl.
*A63F 13/235* (2014.01)
*A63F 13/795* (2014.01)
(Continued)

(52) U.S. Cl.
CPC .......... *A63F 13/235* (2014.09); *A63F 13/323* (2014.09); *A63F 13/327* (2014.09);
(Continued)

(58) Field of Classification Search
CPC ...... A63F 9/00; A63F 9/02; A63F 9/24; A63F 13/235; A63F 13/31
See application file for complete search history.

(56) References Cited

U.S. PATENT DOCUMENTS 8,882,559 B2 * 11/2014 Fessenmaier .......... A63H 30/04
446/321
8,882,560 B2 * 11/2014 Sofman .................. A63H 30/04
446/454
(Continued)

FOREIGN PATENT DOCUMENTS

CN 102940968 A 2/2013
CN 203329343 U 12/2013
(Continued)

OTHER PUBLICATIONS

The World Intellectual Property Organization (WIPO) International Search Report for PCT/CN2016/099088 dated Dec. 7, 2016 5 Pages (including translation).
(Continued)

*Primary Examiner* — Chase E Leichliter
(74) *Attorney, Agent, or Firm* — Anova Law Group, PLLC

(57) ABSTRACT

An intelligent hardware interaction method includes: in the process of running a game application, performing, by a first client, data interaction with first intelligent hardware in wireless communication with the first client, wherein the first client logs into the game application with a first user account, and the game application displays information about the first intelligent hardware; and sending, by the first client, to a second client information generated by the data interaction between the first client and the first intelligent hardware, wherein the second client logs into the game application with a second user account having an association relationship with the first user account, wherein the infor-
(Continued)

mation generated by the data interaction is sent to the second client based on the association relationship, such that the second client shares the information of the first client based on the data interaction with the first intelligent hardware.

20 Claims, 8 Drawing Sheets

(51) Int. Cl.
*A63F 13/323* (2014.01)
*A63F 13/327* (2014.01)
*A63F 13/52* (2014.01)
*A63F 13/42* (2014.01)
*A63F 13/44* (2014.01)
*A63F 13/48* (2014.01)
*A63F 13/92* (2014.01)

(52) U.S. Cl.
CPC .............. *A63F 13/42* (2014.09); *A63F 13/44* (2014.09); *A63F 13/48* (2014.09); *A63F 13/52* (2014.09); *A63F 13/795* (2014.09); *A63F 13/92* (2014.09)

(56) References Cited

U.S. PATENT DOCUMENTS

| | | | |
|---|---|---|---|
| 9,218,316 B2 * | 12/2015 | Bernstein | A63H 30/04 |
| 9,292,758 B2 * | 3/2016 | Polo | G06K 9/3241 |
| 9,550,129 B2 * | 1/2017 | Nave | A63H 30/04 |
| 9,802,130 B2 * | 10/2017 | Reiche | A63F 13/95 |
| 9,827,487 B2 * | 11/2017 | Polo | A63F 13/00 |
| 9,829,882 B2 * | 11/2017 | MacGregor | G05D 1/0011 |
| 2002/0002076 A1 | 1/2002 | Schneier et al. | |
| 2004/0092310 A1 | 5/2004 | Brosnan et al. | |
| 2005/0026697 A1 * | 2/2005 | Balahura | A63F 13/12 463/42 |
| 2009/0005167 A1 * | 1/2009 | Arrasvuori | A63H 33/042 463/40 |
| 2009/0284553 A1 * | 11/2009 | Seydoux | A63F 13/10 345/649 |
| 2010/0261536 A1 * | 10/2010 | Shibamiya | A63F 13/12 463/42 |
| 2012/0004031 A1 * | 1/2012 | Barney | A63F 13/06 463/31 |
| 2012/0323348 A1 * | 12/2012 | Joo | A63F 13/12 700/92 |
| 2013/0005466 A1 * | 1/2013 | Mahajan | A63F 13/216 463/36 |
| 2013/0116044 A1 * | 5/2013 | Schwartz | A63F 13/12 463/29 |
| 2013/0260888 A1 * | 10/2013 | Thornton | A63F 13/80 463/42 |
| 2014/0128155 A1 | 5/2014 | Morioka | |
| 2015/0080125 A1 * | 3/2015 | Andre | A63F 3/00075 463/31 |
| 2015/0258459 A1 * | 9/2015 | Scott | A63F 13/00 463/43 |
| 2018/0256989 A1 * | 9/2018 | Adekunle | A63F 13/235 |

FOREIGN PATENT DOCUMENTS

| | | |
|---|---|---|
| CN | 103678892 A | 3/2014 |
| CN | 104010706 B | 8/2014 |
| CN | 104436651 A | 3/2015 |
| CN | 105288998 A | 2/2016 |
| WO | 2011046014 A1 | 4/2011 |

OTHER PUBLICATIONS

The State Intellectual Property Office of the People's Republic of China (SIPO) Office Action 1 for 201510611668.4 dated Jan. 19, 2018 12 Pages (including translation).

* cited by examiner

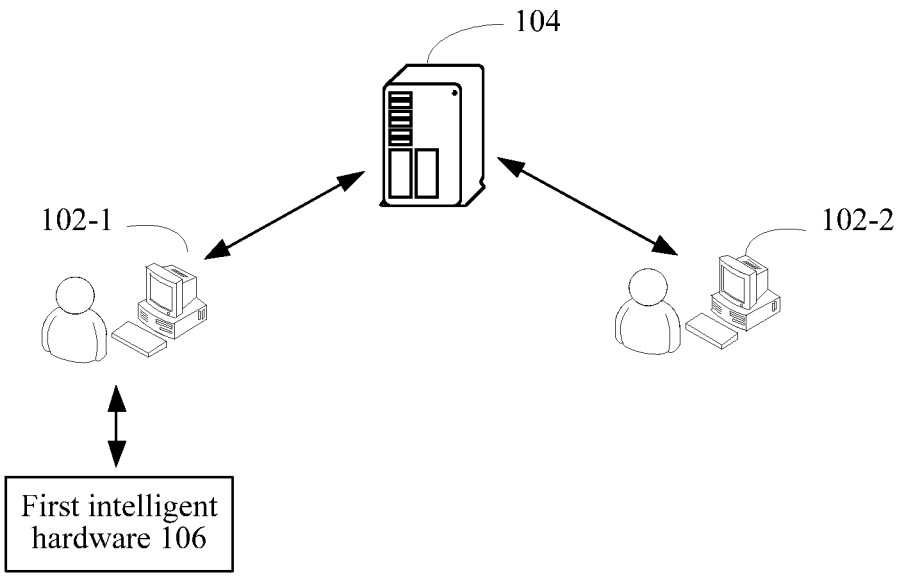

FIG. 1

| A first client of a game application performs, in the process of running the game application in the first client, data interaction with first intelligent hardware that is in wireless communication with the first client, the first client performing login with a first user account, and the game application displaying information about the first intelligent hardware | S202 |

| The first client sends, to a second client of the game application, information generated by the data interaction between the first client and the first intelligent hardware, the second client performing login with a second user account associated with the first user account | S204 |

INTELLIGENT HARDWARE INTERACTION METHOD AND SYSTEM

RELATED APPLICATION

This application is a continuation application of PCT Patent Application No. PCT/CN2016/099088, filed on Sep. 14, 2016, which claims priority to Chinese Patent Application No. 201510611668.4, entitled "INTELLIGENT HARDWARE INTERACTION METHOD AND APPARATUS" filed on Sep. 23, 2015, both of which are incorporated by reference in entirety.

FIELD OF THE TECHNOLOGY

Embodiments of the present invention relate to the communications field and, more specifically, to an intelligent hardware interaction method and system.

BACKGROUND OF THE DISCLOSURE

At present, intelligent devices become increasingly popular and attract attention of a great number of users, from smart household to wearable intelligent devices. However, during data interaction, the existing intelligent devices still remain only at software interaction level, mainly relying on data recording and storage, and the data interaction and the hardware of the intelligent devices are not truly combined. For example, in a game application, a player can only complete the game at a client by using a virtual role, but cannot complete the game with another player by combining intelligent hardware.

That is, currently under existing technology, when using the intelligent device, because the intelligent hardware of the intelligent device can only collect or display data, a client still cannot complete a game by combining the intelligent hardware. Further, it is not feasible to obtain the data after combining the client and the intelligent hardware, and to share with other players on other clients by interaction. At present, it seems that no effective solution is provided for such problems.

SUMMARY

Embodiments of the present invention provide an intelligent hardware interaction method and apparatus, to resolve at least the related technical problem that intelligent hardware cannot be combined with a client to complete a game operation.

According to one aspect of the embodiments of the present invention, an intelligent hardware interaction method is provided. The method includes: in the process of running the game application, performing, by the first client, data interaction with first intelligent hardware in wireless communication with the first client, wherein the first client logs into the game application with a first user account, and the game application displays information about the first intelligent hardware; and sending, by the first client, to the second client information generated by the data interaction between the first client and the first intelligent hardware, wherein the second client logs into the game application with a second user account having an association relationship with the first user account, wherein the information generated by the data interaction is sent to the second client based on the association relationship, such that the second client shares the information of the first client based on the data interaction with the first intelligent hardware.

According to another aspect of the embodiments of the present invention, an intelligent hardware interaction system is provided. The system includes a first terminal as a first client of a game application; first intelligent hardware in wireless communication with the first client; and a second terminal as a second client of the game application. In the process of running the game application, the first client performs data interaction with the first intelligent hardware, the first client logs into the game application with a first user account, and the game application displays information about the first intelligent hardware; the first client sends to the second client information generated by the data interaction between the first client and the first intelligent hardware, and the second client logs into the game application with a second user account having an association relationship with the first user account; and the information generated by the data interaction is sent to the second client based on the association relationship, such that the second client shares the information of the first client based on the data interaction with the first intelligent hardware.

Other aspects of the disclosed subject matter can be understood by those skilled in the art in light of the description, the claims, and the drawings of the present disclosure.

BRIEF DESCRIPTION OF THE DRAWINGS

The accompanying drawings described herein are intended to provide further understanding of the present disclosure and constitute a part of this application. Exemplary embodiments of the present invention and the description thereof are used for explaining the present disclosure rather than limiting the present disclosure. In the accompanying drawings:

FIG. 1 is a schematic diagram of an application environment of an intelligent hardware interaction method according to an embodiment of the present invention;

FIG. 2 is a flowchart of an intelligent hardware interaction method according to an embodiment of the present invention;

DESCRIPTION OF EMBODIMENTS

Figure 3:
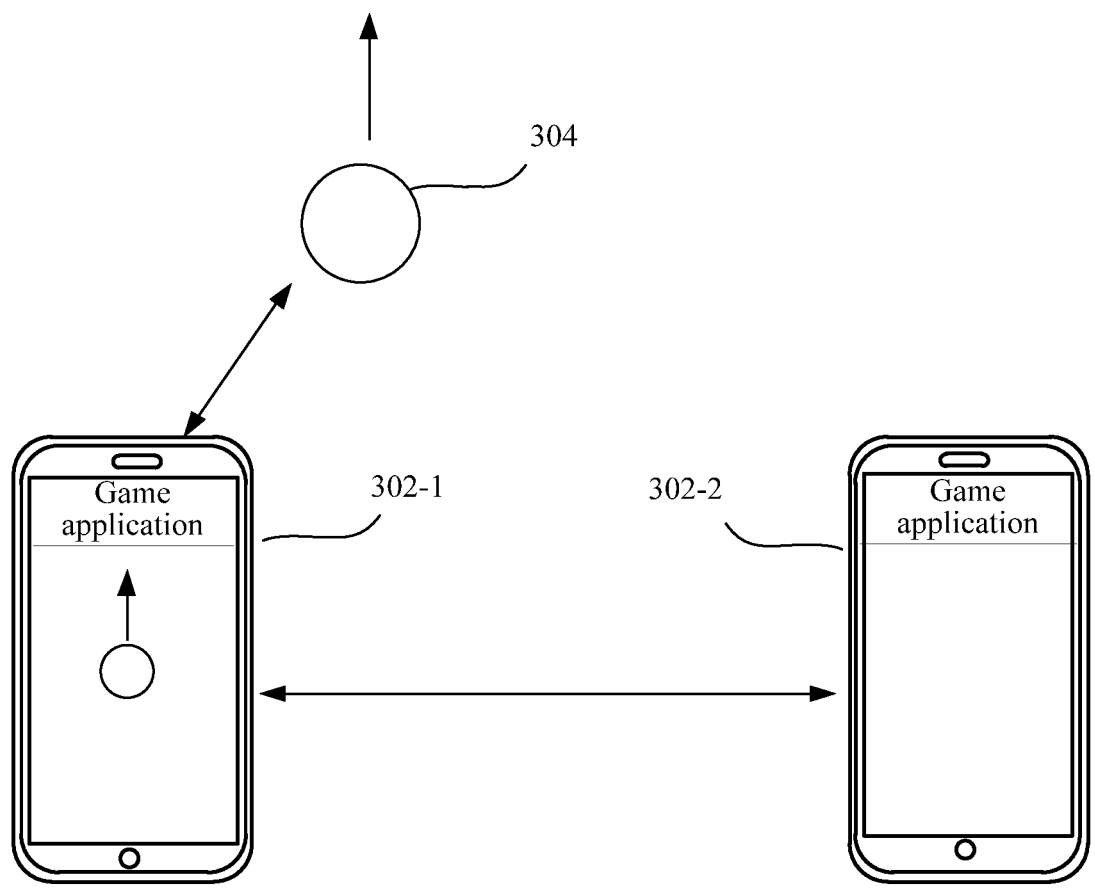
FIG. 3 is a schematic diagram of an intelligent hardware interaction method according to an embodiment of the present invention.

To make a person skilled in the art better understand the solutions of the present disclosure, the followings describe the technical solutions in the embodiments of the present invention with reference to the accompanying drawings. Obviously, the described embodiments are merely some of the embodiments of the present invention rather than all of the embodiments. Other embodiments obtained by a person of ordinary skill in the art based on the disclosed embodiments of the present invention without creative efforts shall fall within the protection scope of the present disclosure.

It should be noted that in the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in orders in addition to the order illustrated or described herein. Moreover, the terms "include", "contain" and any other variants mean to cover the non-exclusive inclusion. For example, a process, method, system, product, or device that includes a list of steps or units is not necessarily limited to those expressly listed steps and units, but may include other steps or units not expressly listed or inherent to such a process, method, system, product, or device.

According to an embodiment of the present invention, an embodiment of an intelligent hardware interaction method is provided. The intelligent hardware interaction method may be, but is not limited to being, applied to an application environment shown in FIG. 1. As shown in FIG. 1, the application environment includes a terminal 102-1, a terminal 102-2, a server 104, and a first intelligent hardware 106.

The terminal 102-1 is installed with a first client of a game application and, when logging in to the first client with a first user account to run the game application, the terminal 102-1 performs data interaction or exchanging with the first intelligent hardware 106 by wireless communication. The information generated by the data interaction between the first client and the first intelligent hardware 106 is transmitted by the server 104 to the terminal 102-2 installed with a second client of the game application. The second client performs login with a second user account associated with the first user account, so that the information generated by the data interaction between the first client logging in to the game application with the first user account and the intelligent hardware in the process of the game application is sent to the second client logging in to the game application with the second user account. The terminal may include, but is not limited to, at least one of the following: a mobile phone, a tablet computer, a notebook computer, or a PC computer, etc.

According to an embodiment of the present invention, an intelligent hardware interaction method is provided. As shown in FIG. 2, the method includes the followings.

S202: When running a game application on a first client, the first client performs data interaction with a first intelligent hardware that is in wireless communication with the first client. The first client performs login with a first user account, and the game application displaying information about the first intelligent hardware.

S204: The first client sends, to a second client of the game application, information generated by the data interaction between the first client and the first intelligent hardware. The second client performs login with a second user account associated with the first user account.

The intelligent hardware interaction method may be, but is not limited to being, applied to a terminal installed with a client of a game application. The game application may include, but is not limited to, an online game or a mobile game. The process of the game application may include, but is not limited to, a round or a set of game. A role in the game application may correspond to the first intelligent hardware. That is, the first client may control a role in the game application running on the client to move, so as to control the first intelligent hardware to move. Alternatively, the first client may directly control the first intelligent hardware, so as to control a role that is in the game application running on the first client and that corresponds to the first intelligent hardware to move. This may avoid the problem in the related technology that the first client cannot be flexibly combined with the first intelligent hardware.

Further, the first client logging in to the game application with the first user account performs the data interaction with the first intelligent hardware by wireless communication in the process of running the game application, so that the flexible software-and-hardware combination between the first client and the first intelligent hardware in the game process can be implemented. Further, the information generated by the data interaction with the first intelligent hardware is sent to the second client logging in to the game application with the second user account. Therefore, the information generated by the interaction between the first client and the first intelligent hardware is sent, based on an existing account association relationship, to the second client, so that the flexible interaction between users and between a user and hardware is implemented, thereby further improving the user experience.

Optionally, the communication connection between the first intelligent hardware and the first client is implemented in the wireless communication, for example, Bluetooth communication or WiFi communication.

Optionally, the first intelligent hardware may include, but not limited to, an intelligent apparatus matched with the game application. The client of the game application is logged in at the terminal, so that the matched first intelligent hardware is controlled. A intelligent hardware may refer to a conventional device that is reconstructed by using a combination of software and hardware to possess certain intelligent function or intelligence. After the intelligence is achieved, the intelligent hardware has the connection capability to load an Internet service and form a typical architecture of "cloud +end", and therefore has the added values such as big data.

Optionally, performing the data interaction with the first intelligent hardware by the first client via wireless communication may include, but is not limited to, at least one of the followings:

(1) Based on an operation result returned by the first intelligent hardware, the first client controls a role in the game application and corresponding to the first intelligent hardware to perform a corresponding operation.

(2) The first client directly controls a role in the game application and corresponding to the first intelligent hardware, so as to control the first intelligent hardware to perform a corresponding operation.

The corresponding operation may include a corresponding action, for example, moving, crashing, PK, or role education simulation, in the game application. Other operations may also be included.

Optionally, the second client may login to the game application with the second user account in response to a game invitation request sent by the first client. The second user account has an association relationship with the first user account of the first client. For example, the second user account is in a friend list of the first user account, or the distance between the location of the second client using the second user account and the location of the first client is less than a preset threshold. That is, the first client may invite, by using a preset association relationship between user accounts, another client (for example, the second client) to participate in the game application by using corresponding intelligent hardware, and share information generated by data interaction with the intelligent hardware. The sharing may include at least one of the following: directly sharing the information with the client participating in the process of the game application, and sharing the information to a shared space.

It should be noted that in the embodiment, the second user account associated with the first user account may be at least one of the following: a second user account associated with the first user account in the game application, or a second user account associated with the first user account in a third-party application that is on the same terminal in which the first client is located.

When the second user account is obtained by using the third-party application (for example, an instant messaging application installed on the terminal), the second user account can also log in to the game application. For example, both a first user account ID-1 and a second user account ID-2 are in the friend relationship in the instant messaging application and, thus, can both log in to the game application. That is, the first user account ID-1 can find the second user account ID-2 by using the game application in addition to obtaining the second user account ID-2 in a friend list in the instant messaging application, so as to invite the second user account ID-2 to log in to the game application to complete the game.

Optionally, the performing data interaction with first intelligent hardware by a first client in the process of running a game application on the first client may include at least one of the following: asynchronous and non-real-time interaction, asynchronous and real-time interaction, or synchronous and real-time interaction.

The asynchronous interaction refers to that, in the process of performing the data interaction with the first intelligent hardware by the first client, the second client may asynchronously control the intelligent hardware corresponding to the second client to perform data interaction. That is, the first client and the second client respectively display roles matched with the corresponding intelligent hardware in display interfaces of respective terminals, to respectively implement asynchronous data interaction with the corresponding intelligent hardware. The synchronous interaction refers to that roles respectively corresponding to the first intelligent hardware and intelligent hardware corresponding to the second client are displayed in a game scenario at the same time, so that the first client and the second client perform synchronous data interaction with the corresponding intelligent hardware. Further, in the embodiment, the "real-time" means that the first client and the second client start running the game application at the same. The "non-real-time" means that the time the first client and the second client start running the game application at different time.

Optionally, the information generated by the data interaction between the first client and the first intelligent hardware may include at least one of the following: a game result and a game state.

Optionally, the information about the first intelligent hardware that is displayed in the game application may include attribute information of the first intelligent hardware. For example, the attribute information of the first intelligent hardware may include: the energy value of the first intelligent hardware, the trip distance or action that has been completed by the first intelligent hardware, or the like.

Specifically, the description is provided with reference to the following example. As shown in FIG. 3, in the process of running the game application, a first client 302-1 performs data interaction with the first intelligent hardware (a smart ball 304 shown in FIG. 3) by wireless communication. Assuming that the smart ball 304 is instructed to move forward, the first client 302-1 correspondingly displays information about the smart ball 304, for example, role information of the smart ball 304, in a display interface, to control a role (a virtual ball on the first client shown in FIG. 3) corresponding to the smart ball 304 to move forward. Further, the first client 302-1 sends, to a second client 302-2 logging in to the game application with the second user account, information generated by the data interaction between the first client 302-1 and the first intelligent hardware (the smart ball 304 shown in FIG. 3).

According to the embodiment provided in this application, in the process of running the game application on the first client, the first client logging in to the game application with the first user account performs the data interaction with the first intelligent hardware by wireless communication, so that the flexible software-and-hardware combination between the first client and the first intelligent hardware in the game process is implemented. Further, the information generated by the data interaction with the first intelligent hardware is sent to the second client logging in to the game application with the second user account. Therefore, the information generated by the interaction between the first client and the first intelligent hardware is sent, based on an existing account association relationship, to the second client, so that the flexible interaction between users and between a user and hardware is implemented, thereby further improving the user experience.

The performing data interaction with a first intelligent hardware by a first client of a game application in the process of running the game application on the first client includes the followings.

S1: In the process of running the game application on the first client, the first client receives an operation result returned by the first intelligent hardware.

S2: The first client updates, according to the operation result, the information about the first intelligent hardware that is displayed in the game application.

Optionally, the first intelligent hardware is directly controlled to control a corresponding role in the game application by using the first intelligent hardware.

Figure 4:
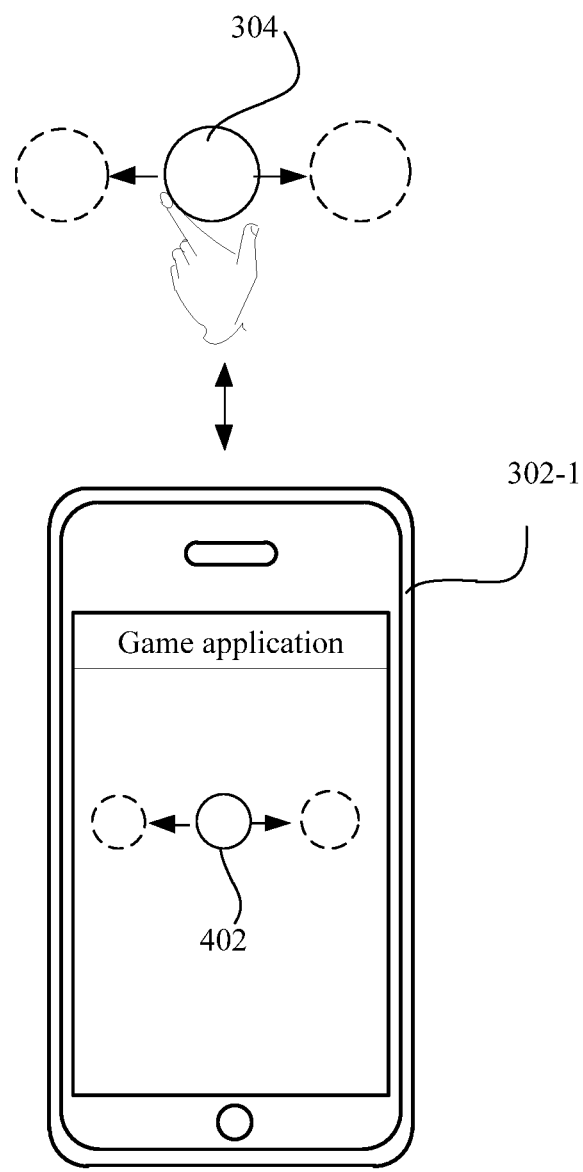
FIG. 4 is a schematic diagram of another intelligent hardware interaction method according to an embodiment of the present invention.

Specifically, in an example shown in FIG. 4, assuming that the first intelligent hardware is a smart ball 304, a role that corresponds to the smart ball 304 and that is in a display interface of a first client 302-1 is a virtual ball 402, and the first client 302-1 receives an operation result from a shaking operation. For example, shaking left and right for three times is performed on the smart ball 304. Further, based on the operation result, the first client 302-1 updates information about the smart ball 304 that is displayed in the game application. That is, as shown in FIG. 4, in a display interface of the terminal in which the first client is located, the virtual ball 402 corresponding to the smart ball 304 is displayed being shaken left and right for three times in virtual space.

It should be noted that in the embodiment, the operation on the first intelligent hardware may include directly performing a corresponding action, for example, moving, crashing, or shaking, on the first intelligent hardware according to the setting of the game application. The control operation is performed on the intelligent hardware, and the operation result is sent to the first client, so that the role that corresponds to the first intelligent hardware and that is on the first client is controlled to perform the same action as the first intelligent hardware in virtual space.

According to the embodiment provided in this application, the operation result returned by the first intelligent hardware is received in the process of running the game application on the first client, and the information about the first intelligent hardware that is displayed in the game application is updated according to the operation result, so that the information about the first intelligent hardware that is displayed on the first client is flexibly updated by using the first intelligent hardware, so as to resolve the related problem that intelligent hardware cannot be combined with a client to complete a game operation, thereby further implementing the flexible interaction between the first client and the first intelligent hardware.

Further, the previous steps in S1 and S2 may also respectively include the followings.

S1: Before the receiving, by the first client, an operation result returned by the first intelligent hardware, the method further includes the following step:

S12: The first client sends an operation instruction to the first intelligent hardware in the process of running the game application on the first client.

S2: The receiving, by the first client in the process of running the game application on the first client, an operation result returned by the first intelligent hardware includes the following step:

S22: The first client receives, in the process of running the game application on the first client, the operation result that is returned by the first intelligent hardware in response to the operation instruction.

Optionally, a role that is in the game application and that corresponds to the first intelligent hardware is directly controlled to control the first intelligent hardware.

Figure 5:
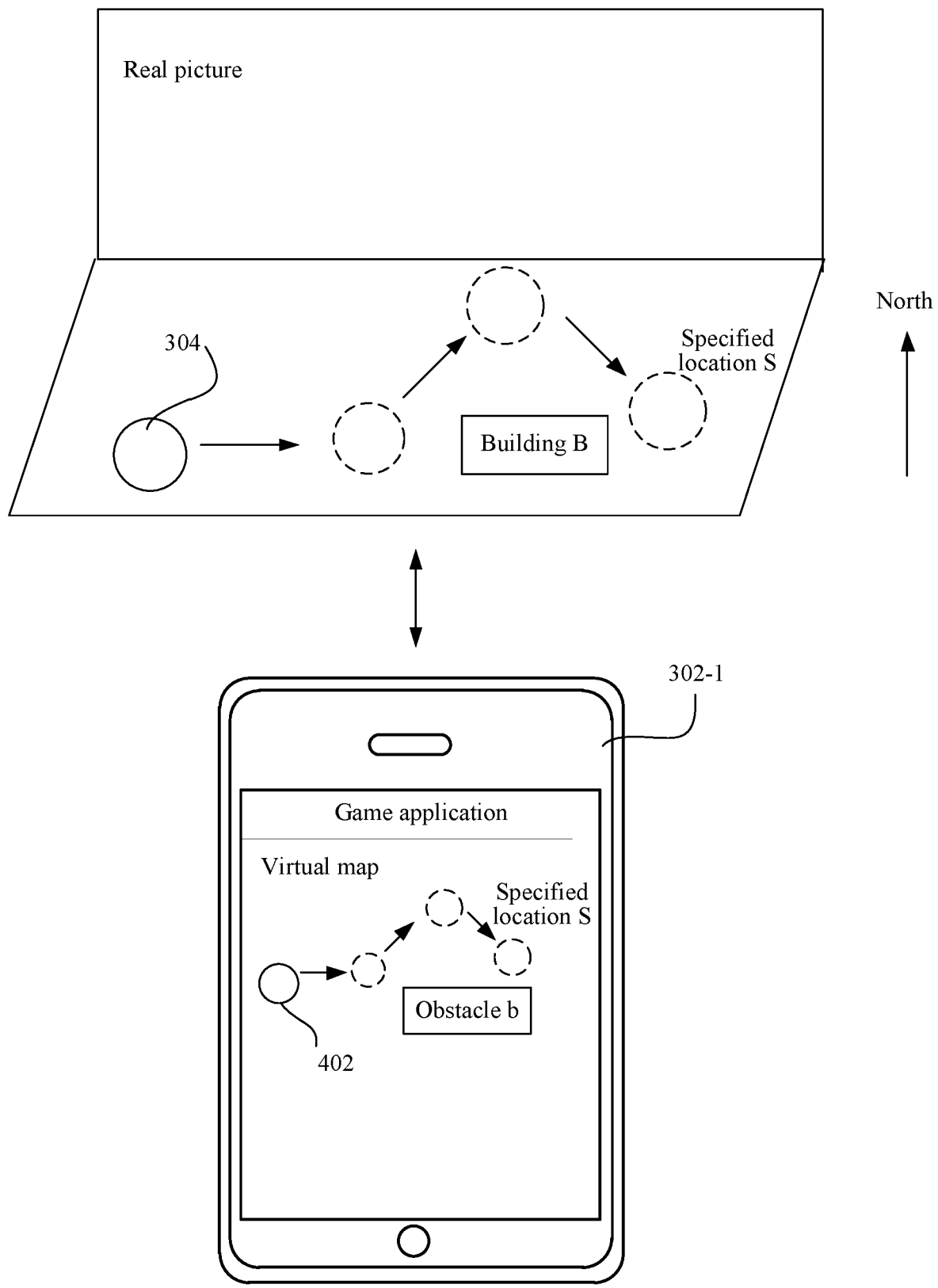
FIG. 5 is a schematic diagram of another intelligent hardware interaction method according to an embodiment of the present invention.

Specifically, in an example shown in FIG. 5, assuming that the first intelligent hardware is a smart ball 304, and a role that corresponds to the smart ball 304 and that is in a display interface of a first client 302-1 is a virtual ball 402. Relative location information of the smart ball 304 in a real scene is obtained. For example, the smart ball 304 is currently in a relatively spacious field, and there is a building B in the south of the field. Therefore, when a virtual map is generated in the game application for the virtual ball 402, an obstacle b may be generated in a corresponding location. Further, the first client 302-1 sends, on the first client 302-1, a moving operation instruction to the smart ball 304, to control the smart ball 304 to bypass the building B to move to a specified location S according to a preset track (shown by the dotted line in the figure). In this case, the first client 302-1 receives movement operation information generated by the smart ball 304 by performing a moving operation according to the moving operation instruction, and synchronously controls, according to the movement operation information, the virtual ball 402 to bypass the obstacle b to move to a corresponding location according to a preset track (shown by the dotted line in the figure) in the virtual map.

It should be noted that in the embodiment, the operation on the first intelligent hardware may include directly sending the operation instruction to the first intelligent hardware according to the setting of the game application, to make the first intelligent hardware perform a corresponding action, for example, moving, crashing, or shaking. That is, a corresponding action is performed, in virtual space according to the setting of the game application, on the role corresponding to the intelligent hardware, so that the first intelligent hardware performs the same action.

According to the embodiment provided in this application, the first client sends the operation instruction to the first intelligent hardware in the process of running the game application on the first client, and the first client receives, in the process of running the game application on the first client, the operation result that is returned by the first intelligent hardware in response to the operation instruction, so that the first intelligent hardware is flexibly controlled by using the first client, so as to resolve the related problem that intelligent hardware cannot be combined with a client to complete a game operation, thereby further implementing the flexible interaction between the first client and the first intelligent hardware.

Optionally, the performing, by a first client of a game application in the process of running the game application on the first client, data interaction with first intelligent hardware that is in wireless communication with the first client may include the following steps.

S1: The first client starts running the game application with the second client at the same time, the second client performing wireless communication with second intelligent hardware, and the game application running on the second client displaying information about the second intelligent hardware.

S2: The first client sends, to the second client, a running result of running the game application on the first client after the running of the game application ends; and/or, the first client receives a running result that is of running the game application on the second client and that is returned by the second client after the running of the game application ends.

Figure 6:
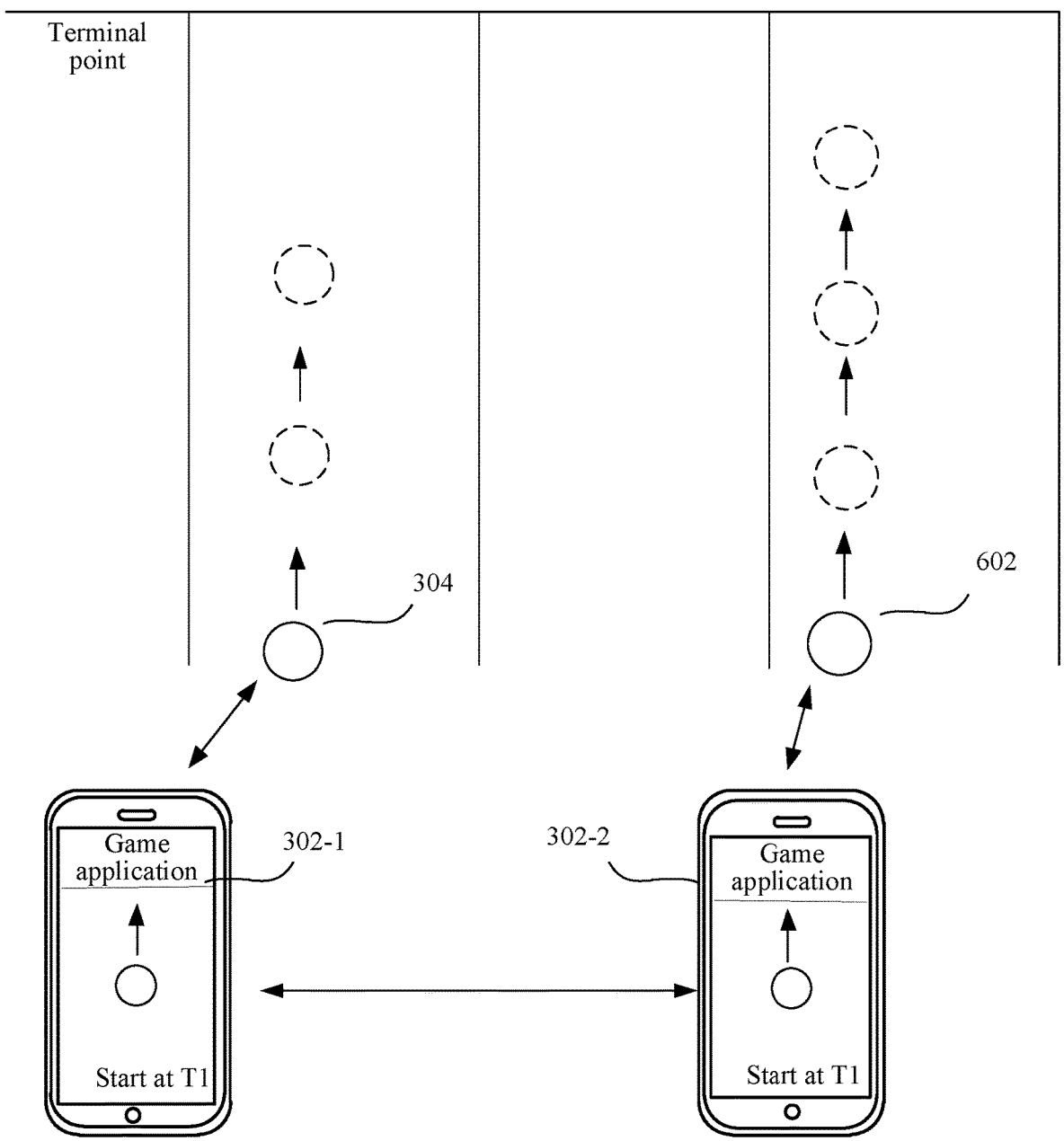
FIG. 6 is a schematic diagram of another intelligent hardware interaction method according to an embodiment of the present invention.

Specifically, for example, using a racing game as the game application, as shown in FIG. 6, a first client 302-1 and a second client 302-2 start running the game application in respective terminals at the same time (for example, both at a T1 time point). The first client 302-1 and the second client 302-2 respectively control, by wireless communication, the first intelligent hardware (a smart ball 304 shown in FIG. 6) and the second intelligent hardware (a smart ball 602 shown in FIG. 6) to move forward quickly, to complete the racing task in a preset racing track. The first client 302-1 and the second client 302-2 respectively display the information about the corresponding intelligent hardware, for example, role information and attribute information corresponding to the intelligent hardware.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to asynchronously control the corresponding intelligent hardware in real time, to run the game application. Therefore, different players can log in to respective clients at different places, to control corresponding intelligent hardware to perform the same game competition at the same time, to improve the user experience.

Optionally, the performing, by a first client of a game application in the process of running the game application on the first client, data interaction with first intelligent hardware that is in wireless communication with the first client may include the followings.

S1: The first client starts running the game application at a first preset time point, the second client performing wireless communication with second intelligent hardware, the second client starts running the game application at a second preset time point that is different from the first preset time point, and the game application running on the second client displaying information about the second intelligent hardware.

S2: The first client sends, to the second client, a running result of running the game application on the first client after the running of the game application ends; and/or the first client receives a running result that is of running the game application on the second client and that is returned by the second client after the running of the game application ends.

Figure 7:
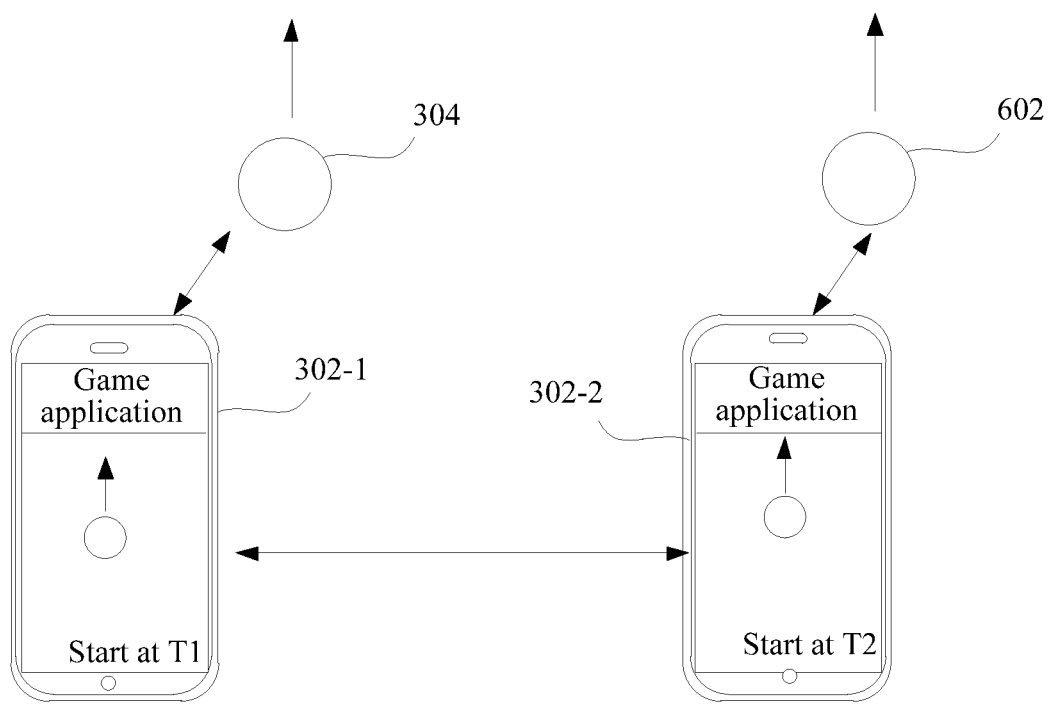
FIG. 7 is a schematic diagram of another intelligent hardware interaction method according to an embodiment of the present invention.

Specifically, for example, using a racing game as the game application, as shown in FIG. 7, a first client 302-1 starts running the game application at a T1 time point, and controls, by wireless communication, the first intelligent hardware (a smart ball 304 shown in FIG. 7) to start moving forward. A second client 302-2 starts running the game application at a T2 time point, and controls, by wireless communication, the second intelligent hardware (a smart ball 602 shown in FIG. 7) to start moving forward. The first client 302-1 and the second client 302-2 respectively display the information about the corresponding intelligent hardware, for example, role information and attribute information corresponding to the intelligent hardware.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to asynchronously control the corresponding intelligent hardware in non-real-time, to run the game application. Therefore, different players can log in to clients in respective terminals at different time points, and start running the game application respectively, to control corresponding intelligent hardware to respectively perform the same game competition, improving the user experience.

Optionally, the performing, by a first client of a game application in the process of running the game application on the first client, data interaction with first intelligent hardware that is in wireless communication with the first client includes the following steps:

S1: The first client and the second client start running the game application at the same time, the first client performing wireless communication with the first intelligent hardware, the second client performing wireless communication with the second intelligent hardware, and the information about the first intelligent hardware and information about the second intelligent hardware is displayed in the game application running on the first client and the game application running on the second client.

S2: The first client sends, to the second client, a running result of running the game application on the first client after the running of the game application ends; and/or the first client receives a running result that is of running the game application on the second client and that is returned by the second client after the running of the game application ends. In other words, the first client and the second client both send the running result to each other such that the running result can be displayed on both terminals for the first client and the second client.

Figure 8:
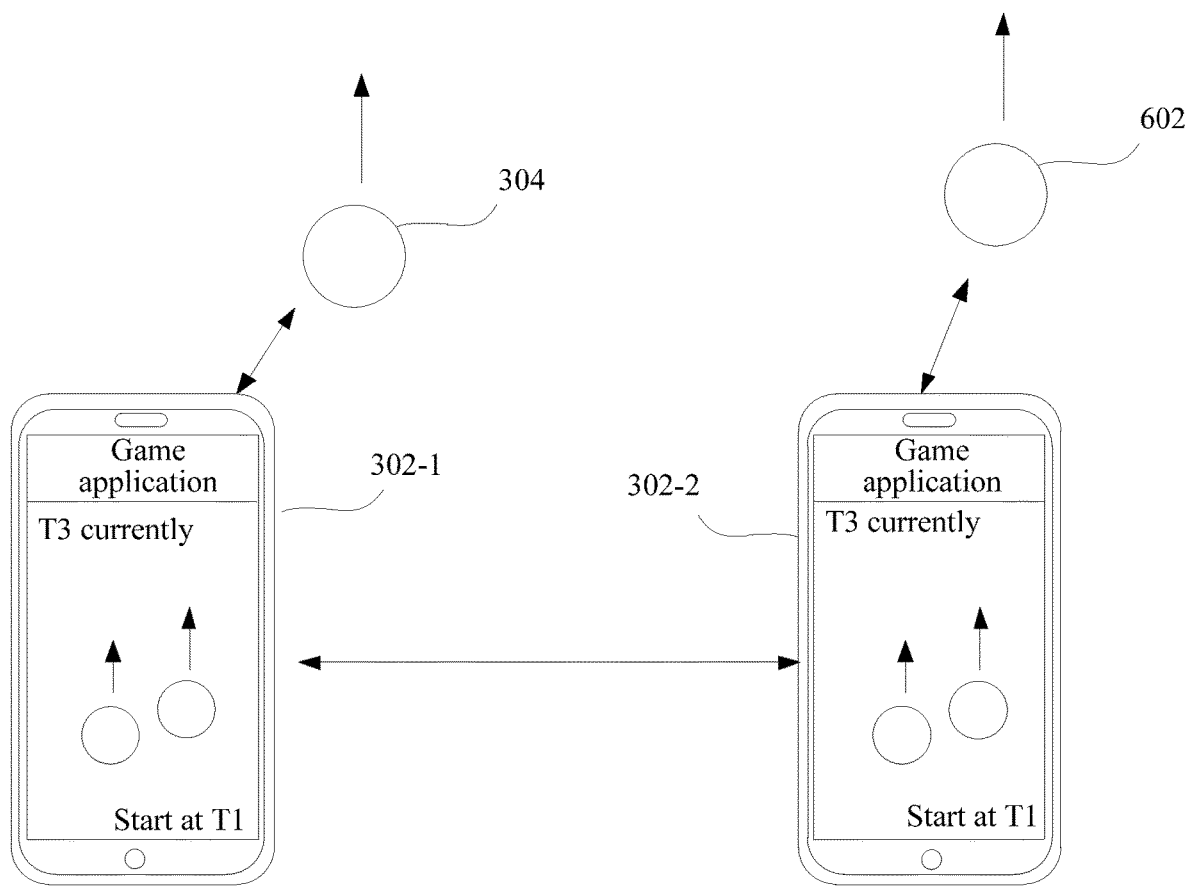
FIG. 8 is a schematic diagram of another intelligent hardware interaction method according to an embodiment of the present invention.

Specifically, as shown in FIG. 8, a first client 302-1 and a second client 302-2 start running the game application in respective terminals at the same time (for example, both at a T1 time point). The first client 302-1 and the second client 302-2 respectively control, by wireless communication, the first intelligent hardware (a smart ball 304 shown in FIG. 8) and the second intelligent hardware (a smart ball 602 shown in FIG. 8) to move forward quickly. The first client 302-1 and the second client 302-2 both display the information corresponding to the two pieces of intelligent hardware, for example, role information and attribute information corresponding to the intelligent hardware. As shown in FIG. 8, at a T3 time point (T3>T1), the first client 302-1 and the second client 302-2 both display the running state of the two pieces of intelligent hardware. The first intelligent hardware (the smart ball 304 shown in the figure) controlled by the first client 302-1 moves slower than the second intelligent hardware (the smart ball 602 shown in the figure) controlled by the second client 302-2. The information can be directly obtained from display interfaces.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to synchronously control the corresponding intelligent hardware, to run the game application, so that different players can see the actual running states of intelligent hardware of different participants in display interfaces at the same time, to facilitate the game players to perform, according to the displayed running state of the intelligent hardware corresponding to other clients, a control operation on the intelligent hardware corresponding to themselves in time.

Optionally, before the performing, by a first client of a game application in the process of running the game application on the first client, data interaction with first intelligent hardware that is in wireless communication with the first client, the method further includes the following.

S1: The first client sends a game invitation request to the second client performing the login with the second user account, the game invitation request being used for requesting the second client to start running the game application with the first client at the same time.

Optionally, before the process of the game application is started, another client (for example, the second client) is invited by sending an invitation request to another client, to start running the game application at the same time. For example, as shown in FIG. 8, the first client 302-1 sends, by using the second user account having an association relationship with the first user account, the invitation request to the second client 302-2 performing the login with the second user account, so that the second client 302-2 participates in the racing game application shown in FIG. 8 together and starts running the game application at the same time.

It should be noted that the second client may receive or refuse the invitation request sent by the first client. For example, when the second intelligent hardware controlled by the second client is damaged and is not beneficial to participating in the racing game application, the second client can select to refuse the invitation. The foregoing is merely an example, and does not limit the embodiment.

According to the embodiment provided in this application, the invitation request is sent to the second client performing the login with the second user account, to invite the second client to start running the game application with the first client at the same time, so that the real-time game competition between the first client and the second client is implemented.

Optionally, before the performing, by a first client of a game application in the process of running the game application on the first client, data interaction with first intelligent hardware that is in wireless communication with the first client, the method further includes the following step:

S1: The first client sends a game invitation request to the second client performing the login with the second user account, the game invitation request being used for requesting the second client to start running the game application before the second preset time point.

Optionally, before the process of the game application is started, another client (for example, the second client) is invited by sending the invitation request to another client, to start running the game application before the preset time point. For example, as shown in FIG. 7, the first client 302-1 sends, by using the second user account having an association relationship with the first user account, the invitation request to the second client 302-2 performing the login with the second user account, so that the second client 302-2 starts running the game application before the preset time point T2. The time point the second client and the first client start running the game application may be different.

It should be noted that after receiving the invitation request, the second client may start running the game application with the first client at the same time, or may start running the game application before the preset time point instructed by the first client.

According to the embodiment provided in this application, the invitation request is sent to the second client performing the login with the second user account, to make the second client start running the game application before the preset time point instructed by the first client, so that the non-real-time game competition between the first client and the second client is implemented.

Optionally, before the performing, by a first client of a game application in the process of running the game application on the first client, data interaction with first intelligent hardware that is in wireless communication with the first client, the method further includes the following steps:

S1: The first client obtains, from a server, a user account having an association relationship with the first user account.

S2: The first client selects the second user account from the user account having the association relationship with the first user account.

Optionally, the association relationship between the first user account and the second user account may include a preset relationship chain. For example, the second user account is in a friend list of the first user account. Alternatively, the distance between the location of the second client using the second user account and the location of the first client is less than or equal to a preset threshold.

Specifically, using an example in which the second user account is in the friend list of the first user account, the first client may obtain, but is not limited to obtaining, from the server of the game application, a user account that is assumed as a user account list (that is, a friend list) and that has an association relationship with the first user account. Therefore, the first client may select the second user account from the user account list, to invite the second user account to start running the game application.

According to the embodiment provided in this application, the second user account used by the second client and the first user account used by the first client have the association relationship. That is, the first client combines, by using the preset relationship chain, respective user accounts having the association relationship with corresponding intelligent hardware, to run the game application, so as to implement, based on the present relationship chain, the flexible combination with the intelligent hardware, improving the user experience.

It should be noted that for each of the foregoing method embodiments, for ease of description, the method embodiment is described as a series of action combinations, but a person skilled in the art should learn that the present disclosure is not limited to an order of described actions because according to the present disclosure, some steps may use another order or be performed at the same time. Besides, a person skilled in the art should learn that the embodiments described in this specification all belong to preferred embodiments, and related actions and modules are not necessary for the present disclosure.

By the description of the foregoing implementation, a person skilled in the art may learn that the method in the foregoing embodiments may be implemented by relying on software and a hardware platform or by using hardware. Based on such an understanding, the technical solutions of the present disclosure, or the part contributing to the related technology, may be presented in the form of a software product. The computer software product is stored in a storage medium (for example, a ROM/RAM, a magnetic disk, or an optical disc) including several instructions to enable a terminal device (which may be a cell phone, a computer, a server, a network device, or the like) to perform the methods described in the embodiments.

Figure 9:
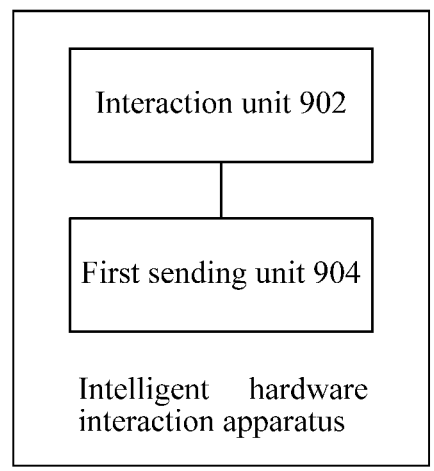
FIG. 9 is a schematic diagram of an intelligent hardware interaction apparatus according to an embodiment of the present invention.

According to an embodiment of the present invention, an embodiment of an intelligent hardware interaction apparatus is provided. The intelligent hardware interaction apparatus may be configured to implement the foregoing intelligent hardware interaction method and located in a terminal including a first client of a game application. As shown in FIG. 9, the apparatus includes an interaction unit 902 and a first sending unit 904.

The interaction unit 902 may be configured to perform, in the process of running the game application on the first client, data interaction with first intelligent hardware that is in wireless communication with the first client, where the first client performs login with a first user account, and the game application displays information about the first intelligent hardware.

The first sending unit 904 may be configured to send, to a second client of the game application, information generated by the data interaction between the first client and the first intelligent hardware, where the second client performs login with a second user account associated with the first user account.

Optionally, the intelligent hardware interaction apparatus may be applied to a terminal installed with a client of a game application. The game application may include an online game or a mobile game. The process of the game application may include a round or a time of a game process in the game application. Optionally, a role in the game application corresponds to the first intelligent hardware. That is, the first client may control a role in the game application running on the client to move, so as to control the first intelligent hardware to move. Alternatively, the first client may directly control the first intelligent hardware to control a role that is in the game application running on the first client and that corresponds to the first intelligent hardware to move, so as to avoid the problem in the related technology that the first client cannot be flexibly combined with the first intelligent hardware.

Further, in the embodiment, the first client logging in to the game application with the first user account performs the data interaction with the first intelligent hardware by wireless communication in the process of running the game application, so that the flexible software-and-hardware combination between the first client and the first intelligent hardware in the game process can be implemented. Further, the information generated by the data interaction with the first intelligent hardware is sent to the second client logging in to the game application with the second user account. Therefore, the information generated by the interaction between the first client and the first intelligent hardware is sent, based on an existing account association relationship, to the second client, so that the flexible interaction between users and between a user and hardware is implemented, thereby further improving the user experience.

Optionally, the communication connection between the first intelligent hardware and the first client is implemented in wireless communication, such as Bluetooth communication or WiFi communication.

Optionally, the first intelligent hardware may include, but not limited to, an intelligent apparatus matched with the game application. The client of the game application is logged in at the terminal, so that the matched first intelligent hardware is controlled. An intelligent hardware may refer to a conventional device that is reconstructed by using a combination of software and hardware to possess certain intelligent function or intelligence. After the intelligence is achieved, the intelligent hardware has the connection capability to load an Internet service and form a typical architecture of "cloud +end", and therefore has the added values such as big data.

Optionally, performing the data interaction with the first intelligent hardware by the first client via wireless communication may include, but is not limited to, at least one of the followings:

(1) Based on an operation result returned by the first intelligent hardware, the first client controls a role in the game application and corresponding to the first intelligent hardware to perform a corresponding operation.

(2) The first client directly controls a role in the game application and corresponding to the first intelligent hardware, so as to control the first intelligent hardware to perform a corresponding operation.

The corresponding operation may include a corresponding action, for example, moving, crashing, PK, or role education simulation, in the game application. Other operations may also be included.

Optionally, the second client may login to the game application with the second user account in response to a game invitation request sent by the first client. The second user account has an association relationship with the first user account of the first client. For example, the second user account is in a friend list of the first user account, or the distance between the location of the second client using the second user account and the location of the first client is less than a preset threshold. That is, the first client may invite, by using a preset association relationship between user accounts, another client (for example, the second client) to participate in the game application by using corresponding intelligent hardware, and share information generated by data interaction with the intelligent hardware. The sharing may include at least one of the following: directly sharing the information with the client participating in the process of the game application, and sharing the information to a shared space.

It should be noted that in the embodiment, the second user account associated with the first user account may be at least one of the following: a second user account associated with the first user account in the game application, or a second user account associated with the first user account in a third-party application that is on the same terminal in which the first client is located.

When the second user account is obtained by using the third-party application (for example, an instant messaging application installed on the terminal), the second user account can also log in to the game application. For example, both a first user account ID-1 and a second user account ID-2 are in the friend relationship in the instant messaging application and, thus, can both log in to the game application. That is, the first user account ID-1 can find the second user account ID-2 by using the game application in addition to obtaining the second user account ID-2 in a friend list in the instant messaging application, so as to invite the second user account ID-2 to log in to the game application to complete the game.

Optionally, the performing data interaction with first intelligent hardware by a first client in the process of running a game application on the first client may include at least one of the following: asynchronous and non-real-time interaction, asynchronous and real-time interaction, or synchronous and real-time interaction.

The asynchronous interaction refers to that, in the process of performing the data interaction with the first intelligent hardware by the first client, the second client may asynchronously control the intelligent hardware corresponding to the second client to perform data interaction. That is, the first client and the second client respectively display roles matched with the corresponding intelligent hardware in display interfaces of respective terminals, to respectively implement asynchronous data interaction with the corresponding intelligent hardware. The synchronous interaction refers to that roles respectively corresponding to the first intelligent hardware and intelligent hardware corresponding to the second client are displayed in a game scenario at the same time, so that the first client and the second client perform synchronous data interaction with the corresponding intelligent hardware. Further, in the embodiment, the "real-time" means that the first client and the second client start running the game application at the same. The "non-real-time" means that the time the first client and the second client start running the game application at different time.

Optionally, the information generated by the data interaction between the first client and the first intelligent hardware may include at least one of the following: a game result and a game state.

Optionally, the information about the first intelligent hardware that is displayed in the game application may include attribute information of the first intelligent hardware. For example, the attribute information of the first intelligent hardware may include: the energy value of the first intelligent hardware, the trip distance or action that has been completed by the first intelligent hardware, or the like.

Specifically, the description is provided with reference to the following example. As shown in FIG. 3, in the process of running the game application, a first client 302-1 performs data interaction with the first intelligent hardware (a smart ball 304 shown in FIG. 3) by wireless communication. Assuming that the smart ball 304 is instructed to move forward, the first client 302-1 correspondingly displays information about the smart ball 304, for example, role information of the smart ball 304, in a display interface, to control a role (a virtual ball on the first client shown in FIG. 3) corresponding to the smart ball 304 to move forward. Further, the first client 302-1 sends, to a second client 302-2 logging in to the game application with the second user account, information generated by the data interaction between the first client 302-1 and the first intelligent hardware (the smart ball 304 shown in FIG. 3).

According to the embodiment provided in this application, the first client logging in to the game application with the first user account performs the data interaction with the first intelligent hardware by wireless communication in the process of running the game application on the first client, so that the flexible software-and-hardware combination between the first client and the first intelligent hardware in the game process is implemented. Further, the information generated by the data interaction with the first intelligent hardware is sent to the second client logging in to the game application with the second user account. Therefore, the information generated by the interaction between the first client and the first intelligent hardware is sent, based on an existing account association relationship, to the second client, so that the flexible interaction between users and between a user and hardware is implemented, thereby further improving the user experience.

Optionally, the interaction unit 902 further includes: a receiving module and an update module. The receiving module is configured to receive, in the process of running the game application on the first client, an operation result returned by the first intelligent hardware. The update module is configured to update, according to the operation result, the information about the first intelligent hardware that is displayed in the game application.

Optionally, the first intelligent hardware is directly controlled to control a corresponding role in the game application by using the first intelligent hardware.

Specifically, in an example shown in FIG. 4, assuming that the first intelligent hardware is a smart ball 304, a role that corresponds to the smart ball 304 and that is in a display interface of a first client 302-1 is a virtual ball 402, and the first client 302-1 receives an operation result from a shaking operation. For example, shaking left and right for three times is performed on the smart ball 304. Further, based on the operation result, the first client 302-1 updates information about the smart ball 304 that is displayed in the game application. That is, as shown in FIG. 4, in a display interface of the terminal in which the first client is located, the virtual ball 402 corresponding to the smart ball 304 is displayed being shaken left and right for three times in virtual space.

It should be noted that in the embodiment, the operation on the first intelligent hardware may include directly performing a corresponding action, for example, moving, crashing, or shaking, on the first intelligent hardware according to the setting of the game application. The control operation is performed on the intelligent hardware, and the operation result is sent to the first client, so that the role that corresponds to the first intelligent hardware and that is on the first client is controlled to perform the same action as the first intelligent hardware in virtual space.

According to the embodiment provided in this application, the operation result returned by the first intelligent hardware is received in the process of running the game application on the first client, and the information about the first intelligent hardware that is displayed in the game application is updated according to the operation result, so that the information about the first intelligent hardware that is displayed on the first client is flexibly updated by using the first intelligent hardware, to resolve the related problem that intelligent hardware cannot be combined with a client to complete a game operation, thereby further implementing the flexible interaction between the first client and the first intelligent hardware.

Optionally, the apparatus further includes: a sending module configured to: before the first client receives an operation result returned by the first intelligent hardware, send an operation instruction to the first intelligent hardware in the process of running the game application on the first client. The receiving module includes: a receiving sub-module configured to receive, in the process of running the game application on the first client, the operation result that is returned by the first intelligent hardware in response to the operation instruction.

Optionally, a role that is in the game application and that corresponds to the first intelligent hardware is directly controlled to control the first intelligent hardware.

Specifically, in an example shown in FIG. 5, assuming that the first intelligent hardware is a smart ball 304, and a role that corresponds to the smart ball 304 and that is in a display interface of a first client 302-1 is a virtual ball 402. Relative location information of the smart ball 304 in a real scene is obtained. For example, the smart ball 304 is currently in a relatively spacious field, and there is a building B in the south of the field. Therefore, when a virtual map is generated in the game application for the virtual ball 402, an obstacle b may be generated in a corresponding location. Further, the first client 302-1 sends, on the first client 302-1, a moving operation instruction to the smart ball 304, to control the smart ball 304 to bypass the building B to move to a specified location S according to a preset track (shown by the dotted line in the figure). In this case, the first client 302-1 receives movement operation information generated by the smart ball 304 by performing a moving operation according to the moving operation instruction, and synchronously controls, according to the movement operation information, the virtual ball 402 to bypass the obstacle b to move to a corresponding location according to a preset track (shown by the dotted line in the figure) in the virtual map.

It should be noted that in the embodiment, the operation on the first intelligent hardware may include directly sending the operation instruction to the first intelligent hardware according to the setting of the game application, to make the first intelligent hardware perform a corresponding action, for example, moving, crashing, or shaking. That is, a corresponding action is performed, in virtual space according to the setting of the game application, on the role corresponding to the intelligent hardware, so that the first intelligent hardware performs the same action.

According to the embodiment provided in this application, the first client sends the operation instruction to the first intelligent hardware in the process of running the game application on the first client, and the first client receives, in the process of running the game application on the first client, the operation result that is returned by the first intelligent hardware in response to the operation instruction, so that the first intelligent hardware is flexibly controlled by using the first client, to resolve the related problem that intelligent hardware cannot be combined with a client to complete a game operation, thereby further implementing the flexible interaction between the first client and the first intelligent hardware.

Optionally, the interaction unit includes a first running module and a first interaction module.

The first running module is configured to start running the game application with the second client at the same time, the second client performing wireless communication with second intelligent hardware, and the game application running on the second client displaying information about the second intelligent hardware.

The first interaction module is configured to: send, to the second client, a running result of running the game application on the first client after the running of the game application ends; and/or receive a running result that is of running the game application on the second client and that is returned by the second client after the running of the game application ends.

Specifically, for example, using a racing game as the game application, as shown in FIG. 6, a first client 302-1 and a second client 302-2 start running the game application in respective terminals at the same time (for example, both at a T1 time point). The first client 302-1 and the second client 302-2 respectively control, by wireless communication, the first intelligent hardware (a smart ball 304 shown in FIG. 6) and the second intelligent hardware (a smart ball 602 shown in FIG. 6) to move forward quickly, to complete the racing task in a preset racing track. The first client 302-1 and the second client 302-2 respectively display the information about the corresponding intelligent hardware, for example, role information and attribute information corresponding to the intelligent hardware.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to asynchronously control the corresponding intelligent hardware in real time, to run the game application. Therefore, different players can log in to respective clients at different places, to control corresponding intelligent hardware to perform the same game competition at the same time, to improve the user experience.

Optionally, the interaction unit includes a second running module and a second interaction module.

The second running module is configured to start running the game application at a first preset time point, the second client performs wireless communication with second intelligent hardware, the second client starts running the game application before a second preset time point that is different from the first preset time point, and the game application running on the second client displays information about the second intelligent hardware.

The second interaction module is configured to: send, to the second client, a running result of running the game application on the first client after the running of the game application ends; and/or receive a running result that is of running the game application on the second client and that is returned by the second client after the running of the game application ends.

Specifically, for example, using a racing game as the game application, as shown in FIG. 7, a first client 302-1 starts running the game application at a T1 time point, and controls, by wireless communication, the first intelligent hardware (a smart ball 304 shown in FIG. 7) to start moving forward. A second client 302-2 starts running the game application at a T2 time point, and controls, by wireless communication, the second intelligent hardware (a smart ball 602 shown in FIG. 7) to start moving forward. The first client 302-1 and the second client 302-2 respectively display the information about the corresponding intelligent hardware, for example, role information and attribute information corresponding to the intelligent hardware.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to asynchronously control the corresponding intelligent hardware in non-real-time, to run the game application. Therefore, different players can log in to clients in respective terminals at different time points, and start running the game application respectively, to control corresponding intelligent hardware to respectively perform the same game competition, improving the user experience.

Optionally, the interaction unit includes a third running module and a third interaction module.

The third running module is configured to start running the game application with the second client at the same time, the second client performs wireless communication with second intelligent hardware, and the information about the first intelligent hardware and information about the second intelligent hardware is displayed in the game application running on the first client and the game application running on the second client; and The third interaction module is configured to: send, to the second client, a running result of running the game application on the first client after the running of the game application ends; and/or receive a running result that is of running the game application on the second client and that is returned by the second client after the running of the game application ends.

Specifically, as shown in FIG. 8, a first client 302-1 and a second client 302-2 start running the game application in respective terminals at the same time (for example, both at a T1 time point). The first client 302-1 and the second client 302-2 respectively control, by wireless communication, the first intelligent hardware (a smart ball 304 shown in FIG. 8) and the second intelligent hardware (a smart ball 602 shown in FIG. 8) to move forward quickly. The first client 302-1 and the second client 302-2 both display the information corresponding to the two pieces of intelligent hardware, for example, role information and attribute information corresponding to the intelligent hardware. As shown in FIG. 8, at a T3 time point (T3>T1), the first client 302-1 and the second client 302-2 both display the running state of the two pieces of intelligent hardware. The first intelligent hardware (the smart ball 304 shown in the figure) controlled by the first client 302-1 moves slower than the second intelligent hardware (the smart ball 602 shown in the figure) controlled by the second client 302-2. The information can be directly obtained from display interfaces.

Further, after the first client 302-1 and the second client 302-2 end the running of the game application in respective terminals, the first client 302-1 sends the running result (for example, the completion time of the racing task) to the second client 302-2; and/or receives the running result (for example, the completion time of the racing task) sent by the second client 302-2, so that game results of the two clients participating in the game application after the game application is completed are obtained, so as to facilitate the ranking or comparison.

According to the embodiment provided in this application, the first client and the second client are controlled to synchronously control the corresponding intelligent hardware, to run the game application, so that different players can see the actual running states of intelligent hardware of different participants in display interfaces at the same time, to facilitate the game players to perform, according to the displayed running state of the intelligent hardware corresponding to other clients, a control operation on the intelligent hardware corresponding to themselves in time.

Optionally, the apparatus further includes a second sending unit. The second sending unit is configured to: before the performing, by a first client of a game application in the process of running the game application on the first client, data interaction with first intelligent hardware that is in wireless communication with the first client, send a game invitation request to the second client performing the login with the second user account, the game invitation request being used for requesting the second client to start running the game application with the first client at the same time.

Optionally, before the process of the game application is started, another client (for example, the second client) is invited by sending an invitation request to another client, to start running the game application at the same time. For example, as shown in FIG. 8, the first client 302-1 sends, by using the second user account having an association relationship with the first user account, the invitation request to the second client 302-2 performing the login with the second user account, so that the second client 302-2 participates in the racing game application shown in FIG. 8 together and starts running the game application at the same time.

It should be noted that the second client may receive or refuse the invitation request sent by the first client. For example, when the second intelligent hardware controlled by the second client is damaged and is not beneficial to participating in the racing game application, the second client can select to refuse the invitation. The foregoing is merely an example, and does not limit the embodiment.

According to the embodiment provided in this application, the invitation request is sent to the second client performing the login with the second user account, to invite the second client to start running the game application with the first client at the same time, so that the real-time game competition between the first client and the second client is implemented.

Optionally, the apparatus further includes a third sending unit. The third sending unit is configured to: before the performing, by a first client of a game application in the process of running the game application on the first client, data interaction with first intelligent hardware that is in wireless communication with the first client, send a game invitation request to the second client performing the login with the second user account, the game invitation request being used for requesting the second client to start running the game application before the second preset time point.

Optionally, before the process of the game application is started, another client (for example, the second client) is invited by sending the invitation request to another client, to start running the game application before the preset time point. For example, as shown in FIG. 7, the first client 302-1 sends, by using the second user account having an association relationship with the first user account, the invitation request to the second client 302-2 performing the login with the second user account, so that the second client 302-2 starts running the game application before the preset time point T2. The time point the second client and the first client start running the game application may be different.

It should be noted that after receiving the invitation request, the second client may start running the game application with the first client at the same time, or may start running the game application before the preset time point instructed by the first client.

According to the embodiment provided in this application, the invitation request is sent to the second client performing the login with the second user account, to make the second client start running the game application before the preset time point instructed by the first client, so that the non-real-time game competition between the first client and the second client is implemented.

Optionally, the apparatus further includes an obtaining unit and a selection unit. The obtaining unit is configured to: before the performing, by a first client of a game application in the process of running the game application on the first client, data interaction with first intelligent hardware that is in wireless communication with the first client, obtain, from a server, a user account having an association relationship with the first user account. The selection unit is configured to select the second user account from the user account having the association relationship with the first user account.

Optionally, the association relationship between the first user account and the second user account may include a preset relationship chain. For example, the second user account is in a friend list of the first user account. Alternatively, the distance between the location of the second client using the second user account and the location of the first client is less than or equal to a preset threshold.

Specifically, using an example in which the second user account is in the friend list of the first user account, the first client may obtain, but is not limited to obtaining, from the server of the game application, a user account that is assumed as a user account list (that is, a friend list) and that has an association relationship with the first user account. Therefore, the first client may select the second user account from the user account list, to invite the second user account to start running the game application.

According to the embodiment provided in this application, the second user account used by the second client and the first user account used by the first client has the association relationship. That is, the first client respectively combines, by using the preset relationship chain, user accounts having the association relationship with corresponding intelligent hardware, to run the game application, so as to implement, based on the present relationship chain, the flexible combination with the intelligent hardware, improving the user experience.

Figure 10:
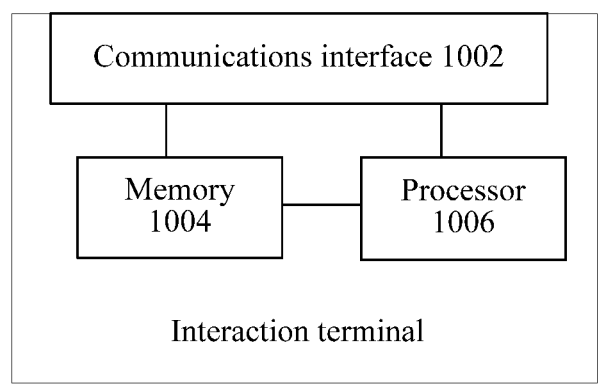
FIG. 10 is a schematic diagram of an interaction terminal according to an embodiment of the present invention.

According to an embodiment of the present invention, an interaction terminal is provided. The interaction terminal is configured to implement the foregoing intelligent hardware interaction method and is installed with a first client of a game application. As shown in FIG. 10, the terminal includes a communications interface 1002, a memory 1004, and a processor 1006.

The communications interface 1002 is configured to perform, in the process of running the game application on the first client, data interaction with first intelligent hardware that is in wireless communication with the first client, the first client performing login with a first user account, and the game application displaying information about the first intelligent hardware.

The memory 1004 is connected to the communications interface 1002, and configured to store the information about the first intelligent hardware. The processor 1006 is connected to the memory 1004 and the communications interface 1002, and configured to send, to a second client of the game application, information generated by the data interaction between the first client and the first intelligent hardware, the second client performing login with a second user account associated with the first user account.

The various components of the interaction terminal may implement the methods and structures disclosed in previous embodiments, details of which is omitted herein.

According to an embodiment of the present disclosure, a computer-readable storage medium is provided. Optionally, the storage medium may be located in at least one network device among multiple network devices in networks such as mobile communication networks, wide area networks, metropolitan area networks, or local area networks.

Optionally, the storage medium is configured to store program code for performing the following processes.

S1: performing, by a first client of a game application in the process of running the game application on the first client, data interaction with first intelligent hardware that is in wireless communication with the first client, where the first client performs login with a first user account, and the game application displays information about the first intelligent hardware.

S2: sending, by the first client, to a second client of the game application, information generated by the data interaction between the first client and the first intelligent hardware, where the second client performs login with a second user account associated with the first user account.

Optionally, the storage medium is further configured to store program code used for performing the following steps: receiving, in the process of running the game application on the first client, an operation result returned by the first intelligent hardware; and updating, according to the operation result, the information about the first intelligent hardware that is displayed in the game application.

Optionally, the storage medium is further configured to store program code used for performing the following steps: before the receiving an operation result returned by the first intelligent hardware, sending, by the first client, an operation instruction to the first intelligent hardware in the process of running the game application on the first client; and receiving, by the first client in the process of running the game application on the first client, the operation result that is returned by the first intelligent hardware in response to the operation instruction.

Optionally, the storage medium is further configured to store program code used for performing the following steps: starting running the game application with the second client at the same time, the second client performing wireless communication with second intelligent hardware, and the game application running on the second client displaying information about the second intelligent hardware; and sending, to the second client, a running result of running the game application on the first client after the running of the game application ends; and/or, receiving a running result that is of running the game application on the second client and that is returned by the second client after the running of the game application ends.

Optionally, the storage medium is further configured to store program code used for performing the following steps: starting running the game application at a first preset time point, the second client performing wireless communication with second intelligent hardware, the second client starting running the game application before a second preset time point that is different from the first preset time point, and the game application running on the second client displaying information about the second intelligent hardware; and sending, to the second client, a running result of running the game application on the first client after the running of the game application ends; and/or receiving a running result that is of running the game application on the second client and that is returned by the second client after the running of the game application ends.

Optionally, the storage medium is further configured to store program code used for performing the following steps: starting running the game application with the second client at the same time, the second client performing wireless communication with second intelligent hardware, and the information about the first intelligent hardware and information about the second intelligent hardware being displayed in the game application running on the first client and the game application running on the second client; and sending, to the second client, a running result of running the game application on the first client after the running of the game application ends; and/or receiving a running result that is of running the game application on the second client and that is returned by the second client after the running of the game application ends.

Optionally, the storage medium is further configured to store program code used for performing the following step: before the performing, in the process of running the game application on the first client, data interaction with first intelligent hardware that is in wireless communication with the first client, sending a game invitation request to the second client performing the login with the second user account, the game invitation request being used for requesting the second client to start running the game application with the first client at the same time.

Optionally, the storage medium is further configured to store program code used for performing the following step: before the performing, in the process of running the game application on the first client, data interaction with first intelligent hardware that is in wireless communication with the first client, sending a game invitation request to the second client performing the login with the second user account, the game invitation request being used for requesting the second client to start running the game application before the second preset time point.

Optionally, the storage medium is further configured to store program code used for performing the following steps: before the performing, in the process of running the game application on the first client, data interaction with first intelligent hardware that is in wireless communication with the first client, obtaining, from a server, a user account having an association relationship with the first user account; and selecting the second user account from the user account having the association relationship with the first user account.

Optionally, the storage medium may include a medium such as a USB flash drive, a read-only memory (ROM), a random access memory (RAM), a removable hard disk, a magnetic disk, or an optical disc that can store program code.

When the integrated unit in the foregoing embodiment is implemented in the form of a software function unit and sold or used as an independent product, the integrated unit may be stored in the foregoing computer readable storage medium. Based on such an understanding, the technical solutions of the present disclosure, or the part contributing to the related technology, or all or some of the technical solutions may be presented in the form of a software product. The computer software product is stored in a storage medium, and includes several instructions for instructing one or more computer devices (which may be a personal computer, a server, a network device, or the like) to perform all or some of the steps of the methods described in the embodiments of the present invention.

In the foregoing embodiments of the present invention, the descriptions of the embodiments have their respective focuses. For a part that is not described in detail in an embodiment, refer to related descriptions in other embodiments.

In the several embodiments provided in this application, it should be understood that the provided client may be implemented in another manner. The apparatus embodiments described above are merely exemplary. For example, the division of the units is merely the division of logic functions, and may use other division manners during actual implementation. For example, multiple units or components may be combined, or may be integrated into another system, or some features may be omitted or not performed. In addition, the coupling, or direct coupling, or communication connection between the displayed or discussed components may be the indirect coupling or communication connection by some interfaces, units, or modules, and may be electrical, mechanical, or of other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

The foregoing descriptions are exemplary implementation manners of the present disclosure. It should be noted that a person of ordinary skill in the art may make certain improvements and polishing without departing from the principle of the present disclosure and the improvements and polishing shall fall within the protection scope of the present disclosure.

Industrial Applicability

In the embodiments of the present invention, a first client logging in to a game application with a first user account performs data interaction with first intelligent hardware by wireless communication in the process of running the game application on the first client, so that the flexible software-and-hardware combination between the first client and the first intelligent hardware in the game process is implemented. Further, information generated by the data interaction with the first intelligent hardware is sent to a second client logging in to the game application with a second user account. Therefore, the information generated by the interaction between the first client and the first intelligent hardware is sent, based on an existing account association relationship, to the second client, so that the flexible interaction between users and between a user and hardware can be implemented, thereby further improving the user experience. Further, the related technical problem that intelligent hardware cannot be combined with a client to complete a game operation is resolved.

What is claimed is:

1. An intelligent hardware interaction method for a game application on a first client and a second client, comprising:
   in the process of running the game application, performing, by the first client, data interaction with first intelligent hardware in wireless communication with the first client, wherein the first client logs into the game application with a first user account, and the game application displays information about the first intelligent hardware;
   displaying, by the first client, a virtual role in the game application that corresponds to the first intelligent hardware;
   receiving, by the first client, movement operation information from the first intelligent hardware generated according to a physical action performed by the first intelligent hardware, and synchronously controlling the virtual role in the game application to act according to the movement operation information of the first intelligent hardware, the physical action including moving, shaking, and crashing;
   controlling, by the first client, the first intelligent hardware to move according to a movement instruction on the virtual role in the game application of the first client based on user input, the movement instruction including moving to a specified location according to a track; and
   sending, by the first client, to the second client information generated by the data interaction between the first client and the first intelligent hardware, wherein the second client logs into the game application with second user account having an association relationship with the first user account, and the information generated by the data interaction is sent to the second client based on the association relationship, such that the second client shares the information of the first client based on the data interaction with the first intelligent hardware.

2. The method according to claim 1, wherein the performing, by the first client, data interaction with first intelligent hardware in wireless communication with the first client comprises:
   receiving, by the first client, an operation result returned by the first intelligent hardware; and
   according to the operation result, updating, by the first client, the information about the first intelligent hardware that is displayed in the game application.

3. The method according to claim 2, wherein, before receiving, by the first client, an operation result returned by the first intelligent hardware, the method further comprises:
   sending, by the first client, an operation instruction to the first intelligent hardware in the process of running the game application on the first client; and
   the receiving, by the first client, an operation result returned by the first intelligent hardware comprises:

receiving, by the first client, the operation result that is returned by the first intelligent hardware in response to the operation instruction.

4. The method according to claim 1, wherein the performing, by the first client, data interaction with first intelligent hardware in wireless communication with the first client comprises:

starting, by the first client, running the game application with the second client at the same time, wherein the second client is in wireless communication with a second intelligent hardware, and the game application running on the second client displays information about the second intelligent hardware;

sending, by the first client to the second client, a running result of the game application on the first client; and receiving, by the first client from the second client, a running result of the game application on the second client.

5. The method according to claim 1, wherein the performing, by the first client, data interaction with first intelligent hardware in wireless communication with the first client comprises:

starting, by the first client, running the game application to participate in a game with the second client at the same time, wherein the second client is in wireless communication with the second intelligent hardware;

exchanging and displaying the information about the first intelligent hardware and information about the second intelligent hardware in the game application running on the first client and on the second client in real time during a process of the game;

sending, by the first client to the second client, a running result of the game in the game application on the first client; and receiving, by the first client from the second client, a running result of the game in the game application on the second client.

6. The method according to claim 5, wherein, before performing, by the first client, data interaction with first intelligent hardware in wireless communication with the first client, the method further comprises:

sending, by the first client, a game invitation request to the second client, the game invitation request being used for requesting the second client to start running the game application with the first client at the same time.

7. The method according to claim 1, wherein, before performing, by the first client, data interaction with first intelligent hardware in wireless communication with the first client, the method further comprises:

obtaining, by the first client from a server, at least one user account having an association relationship with the first user account; and selecting, by the first client, the second user account from the at least one user account having the association relationship with the first user account.

8. The method according to claim 1, wherein the performing, by the first client, data interaction with first intelligent hardware in wireless communication with the first client comprises:

starting, by the first client, running the game application to participate in a game at a first preset time point, wherein the second client is in wireless communication with a second intelligent hardware, the second client starts running the game application to participate in the game before a second preset time point that is different from the first preset time point, and the game application running on the second client displays information about the second intelligent hardware;

sending, by the first client to the second client, a running result of the game in the game application on the first client; and receiving, by the first client from the second client, a running result of the game in the game application on the second client.

9. The method according to claim 8, wherein, before performing, by the first client, data interaction with first intelligent hardware in wireless communication with the first client, the method further comprises:

sending, by the first client, a game invitation request to the second client, the game invitation request being used for requesting the second client to start running the game application before the second preset time point.

10. The method according to claim 1, further comprising:

displaying the virtual role corresponding to the first intelligent hardware on a virtual map in the game application; and displaying the track corresponding to the movement instruction on the virtual map.

11. The method according to claim 10, further comprising:

displaying, on the virtual map, a virtual obstacle at a location corresponding to a physical location of a real world object;

wherein the movement instruction is bypassing the object according to the track.

12. An intelligent hardware interaction system, comprising:

a first terminal as a first client of a game application;

first intelligent hardware in wireless communication with the first client; and a second terminal as a second client of the game application;

wherein:

in the process of running the game application, the first client is configured to:

perform data interaction with the first intelligent hardware, the first client logs into the game application with a first user account, and the game application displays information about the first intelligent hardware, the first user account being an account of a third-party application installed on the first client;

display a virtual role in the game application that corresponds to the first intelligent hardware;

receive movement operation information from the first intelligent hardware generated according to a physical action performed by the first intelligent hardware, and synchronously controlling the virtual role in the game application to act according to the movement operation information of the first intelligent hardware, the physical action including moving, shaking, and crashing;

control the first intelligent hardware to move according to a movement instruction on the virtual role in the game application of the first client based on user input, the movement instruction including moving to a specified location according to a track; and send information generated by the data interaction between the first client and the first intelligent hardware to the second client based on an association relationship, such that the second client shares the information of the first client based on the data interaction with the first intelligent hardware, wherein the game application of the second client is logged in with second user account having the association relationship with the first user account.

13. The system according to claim 12, wherein, to perform data interaction with the first intelligent hardware, the first client receives an operation result returned by the first intelligent hardware and, according to the operation result, update the information about the first intelligent hardware that is displayed in the game application.

14. The system according to claim 13, wherein, to receive the operation result returned by the first intelligent hardware, the first client sends an operation instruction to the first intelligent hardware in the process of running the game application on the first client; and receive the operation result that is returned by the first intelligent hardware in response to the operation instruction.

15. The system according to claim 12, wherein:
the first client is configured to start running the game application to participate in a game at a first preset time point;
the second client is configured to start running the game application to participate in the game before a second preset time point that is different from the first preset time point;
the game application running on the second client is configured to display information about the second intelligent hardware;
the first client is configured to send to the second client a running result of the game in the game application on the first client, and receive from the second client a running result of the game in the game application on the second client.

16. The system according to claim 15, wherein, before performing the data interaction with first intelligent hardware, the first client sends a game invitation request to the second client, the game invitation request being used for requesting the second client to start running the game application before the second preset time point.

17. The system according to claim 12, wherein:
the first client is configured to:
start running the game application with the second client at the same time;
exchange and display the information about the first intelligent hardware and information about the second intelligent hardware in the game application running on the first client and on the second client in real time during a process of the game; and
send to the second client a running result of the game in the game application on the first client, and receive from the second client a running result of the game in the game application on the second client.

18. The system according to claim 17, wherein, before performing the data interaction with the first intelligent hardware, the first client sends a game invitation request to the second client, the game invitation request being used for requesting the second client to start running the game application with the first client at the same time.

19. The system according to claim 12, further comprising a server, wherein:
before performing the data interaction with the first intelligent hardware, the first client is configured to from the server at least one user account having an association relationship with the first user account, and select and invite the second user account from the at least one user account having the association relationship with the first user account.

20. The system according to claim 19, wherein:
the second client is configured to refuse an invitation from the first client in response to detecting that the second intelligent hardware is damaged or is not beneficial to participating in a game of the game application.

* * * * *